(12) United States Patent  (10) Patent No.: US 7,420,778 B2
Sassine et al.  (45) Date of Patent: Sep. 2, 2008

(54) SUSPENSION COMPONENT WITH SEALED DAMPING LAYER

(75) Inventors: Joseph H. Sassine, Lakeville, MN (US); Joel David Limmer, Bloomington, MN (US); Zine-Eddine Boutaghou, North Oaks, MN (US); Roger Lee Hipwell, Jr., Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 815 days.

(21) Appl. No.: 10/744,266

(22) Filed: Dec. 22, 2003

(65) Prior Publication Data

US 2005/0135013 A1  Jun. 23, 2005

(51) Int. Cl.
G11B 5/48  (2006.01)
(52) U.S. Cl. .................................................. 360/244.9
(58) Field of Classification Search ........................ None
See application file for complete search history.

(56) References Cited

U.S. PATENT DOCUMENTS

| | | | |
|---|---|---|---|
| 4,447,493 A * | 5/1984 | Driscoll et al. .............. 428/332 |
| 4,819,094 A * | 4/1989 | Oberg ...................... 360/245.9 |
| 5,187,625 A | 2/1993 | Blaeser et al. .............. 360/104 |
| 5,408,372 A | 4/1995 | Karam, II .................... 360/104 |
| 5,594,607 A | 1/1997 | Erpelding et al. ........... 360/104 |
| 5,606,477 A | 2/1997 | Erpelding et al. ........... 360/104 |
| 5,761,184 A | 6/1998 | Dauber et al. ............... 369/247 |
| 5,796,553 A | 8/1998 | Tangren ...................... 360/104 |
| 5,914,837 A | 6/1999 | Edwards et al. ............. 360/106 |
| 6,005,750 A | 12/1999 | Willard et al. ............... 360/104 |
| 6,212,043 B1 | 4/2001 | Nakamura et al. ........ 360/244.3 |
| 6,297,933 B1 | 10/2001 | Khan et al. .............. 360/244.2 |
| 6,433,957 B1 | 8/2002 | Rudd et al. .............. 360/97.02 |
| 2002/0057536 A1 | 5/2002 | Boutaghou et al. ....... 360/265.9 |
| 2002/0109943 A1 | 8/2002 | Crane et al. .............. 360/244.3 |
| 2002/0134492 A1 | 9/2002 | Freeman et al. ............. 156/182 |

* cited by examiner

*Primary Examiner*—Mark Blouin
(74) *Attorney, Agent, or Firm*—Westman, Champlin & Kelly, P.A.

(57) ABSTRACT

An assembly includes a suspension component with a surface extending over a flexible region of the suspension component. The assembly also includes a damping layer disposed in a pattern that extends onto the surface. A sealing layer that is non-friable covers the damping layer. The sealing layer also preferably comprises a shear restraint layer for the damping layer.

20 Claims, 15 Drawing Sheets

SUSPENSION COMPONENT WITH SEALED DAMPING LAYER

FIELD OF THE INVENTION

The present invention relates generally to damping of suspension components, and more particularly but not by limitation to damping materials that are friable.

BACKGROUND OF THE INVENTION

In disc drive head gimbal assemblies (HGAs), damping is desirable to attenuate resonant vibrations. Adding damping in the most effective areas (where strains due to vibration are highest) is difficult because those high strain areas are also the most fragile areas of the HGA (for example, the hinge and gimbal). Adhesive dampers can be used, however, adhesive damping materials have exposed areas where friable particles of adhesive can break loose and contaminate the drive with particles and cause the disc drive to fail.

Embodiments of the present invention provide solutions to these and other problems, and offer other advantages over the prior art.

SUMMARY OF THE INVENTION

Disclosed is an assembly that includes a suspension component with a surface that extends over a flexible region of the suspension component. The assembly also includes a damping layer disposed in a pattern that extends onto the surface. A sealing layer that is non-friable covers the damping layer. In a preferred arrangement, the sealing layer also serves as a shear restraint layer for the damping layer.

Other features and benefits that characterize embodiments of the present invention will be apparent upon reading the following detailed description and review of the associated drawings.

DETAILED DESCRIPTION OF ILLUSTRATIVE EMBODIMENTS

In the embodiments illustrated below, a damping layer and a sealing layer are disposed on a surface overlying a flexible region of a suspension component. Damping material is typically friable and releases particles that can contaminate an environment surrounding the suspension component, causing mechanical failures. The sealing layer substantially covers the damping layer and traps undesired particles that break loose from the damping layer. The sealing layer can also serve as a shear restraint layer so that the damping layer is bonded on one side to the suspension component surface and bonded on an opposite side to the sealing layer. The combined shear restraint on both sides of the damping layer greatly increases strain in the damping layer and makes the damping layer more effective in damping vibrations. The arrangement is particularly useful in micromechanical assemblies such as disc drives where low mass damping is required and very small particles can interfere with closely fitting moving parts.

Figure 1:
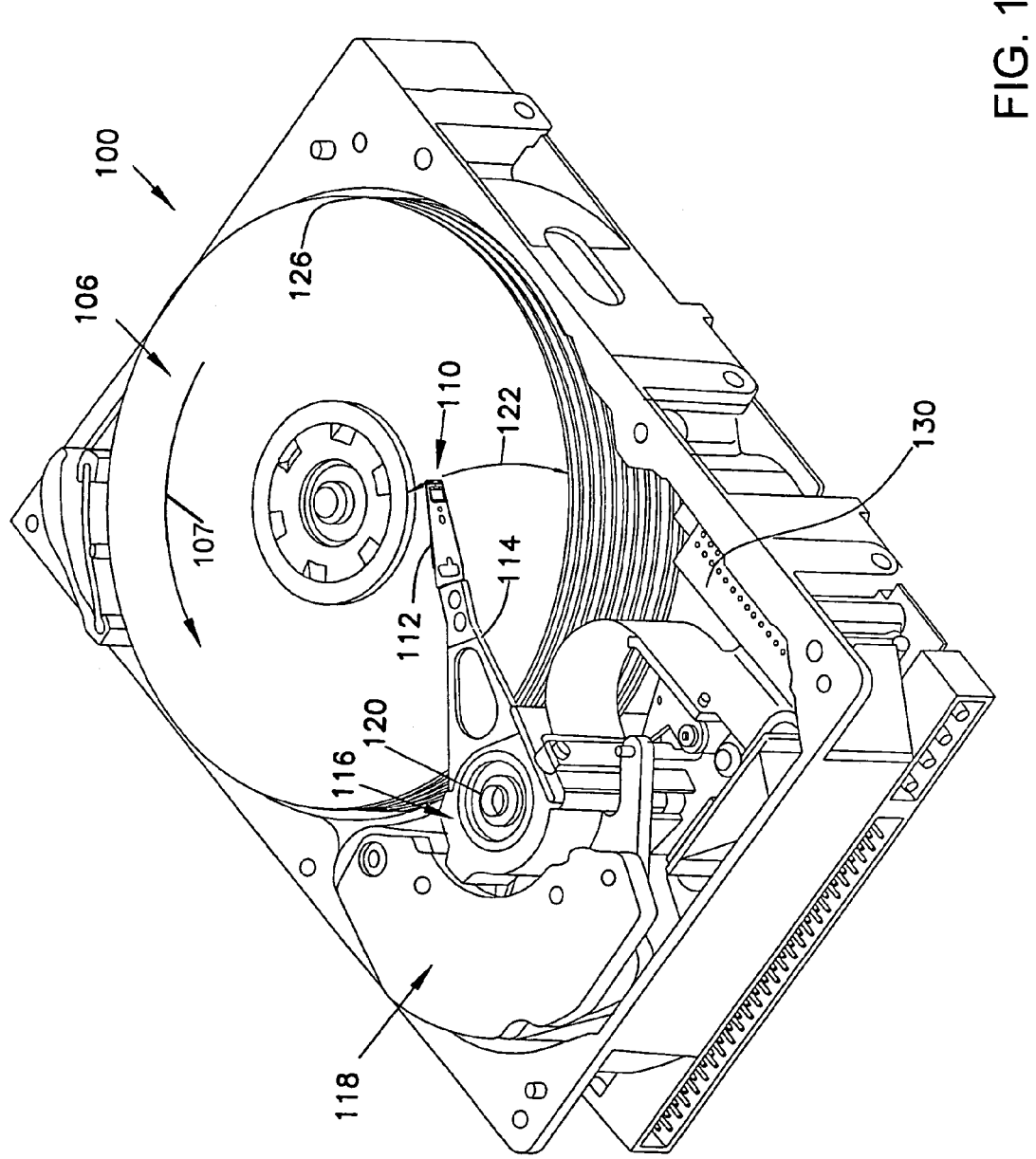
FIG. 1 illustrates an oblique view of a disc drive storage device.

In FIG. 1, an embodiment of a disc drive 100 is illustrated. Disc drive 100 includes a pack of multiple discs 126 having storage surfaces 106 that are typically layers of magnetic material. The disc drive 100 also includes a head gimbal assembly (HGA) 112 that includes a read/write head 110 for each stacked disc. The head gimbal assembly 112 is attached to an arm 114 of a voice coil motor 118. The pack of discs 126 is spun or rotated as shown by arrow 107 to allow the head-gimbal assembly 112 to access different rotational locations for data on the storage surfaces 106 of the discs 126.

The head gimbal assembly 112 is actuated to move radially, relative to the discs 126, as shown by arrow 122 to access different radial locations for data on the storage surfaces 106 of discs 126. Typically, the actuation of head gimbal assembly 112 is provided by the voice coil motor 118. Voice coil motor 118 includes a rotor 116 that pivots on axle 120. The arm 114 actuates the head gimbal assembly 112. Disc drive 100 includes electronic circuitry 130 for controlling the operation of the disc drive and transferring data in and out of the disc drive. A beam component of a head gimbal assembly 112 is explained in more detail below in connection with FIG. 2.

Figure 2:
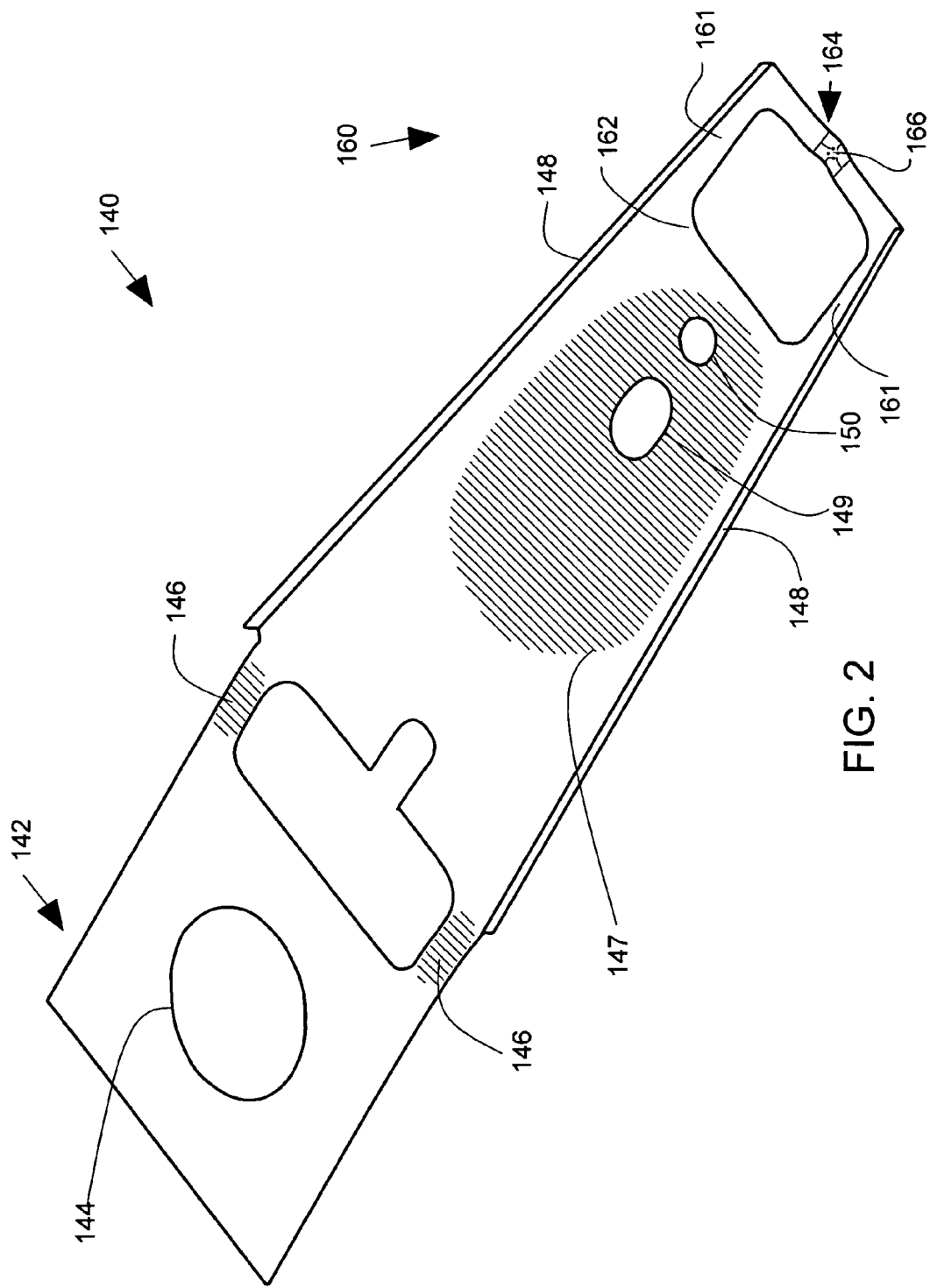
FIG. 2 illustrates a top isometric view of a load beam that includes flexible regions.

FIG. 2 illustrates a top isometric view of a beam 140 that serves as a suspension component. Beam 140 functions as a load beam that applies a mechanical load to a read/write head (110, FIG. 1). The beam 140 is preferably formed of stainless steel and extends from a first end 142 that includes a mounting hole 144 to a second end 160 that includes a window frame 162 and a preload dimple 166 in a gimbal region 164. The beam 140 includes preload spring regions 146, which generate the preload force that is applied at the preload dimple 166. The preload spring regions are flexible regions that include surfaces indicated by diagonal lines that extend over the flexible regions. There can be other surfaces such as surface 147 that are in relatively unsupported regions of the beam 140 that are also subject to flexing due to vibration. The flexible region 147 extends around holes 149, 150. The main body of the beam 140 includes side rails 148 that extend alongside the window frame 162. Flat sections 161 on the sides of the window frame 162 join with the side rail 148 to form forming margins for the beam 140. The load force from preload spring regions 146 is transferred through the forming margins (straight sections 161 and adjacent portions of rails 148) which stiffen the beam 140 in the off-track direction.

The flexible regions 146, 147 are subject to undesirable vibration that can result in sideways motion of the read/write head sometimes referred to as "lateral offtrack motion." Damping is desired in order to suppress the undesirable vibration, however damping material used in this application is typically friable and tends to contaminate the disc drive with particles. Damping that overcomes this problem is described below in connection with examples illustrated in FIGS. 3-20.

FIGS. 3-8 illustrate examples of sealing layers 180 and damping layers 182 disposed on flexible regions 184 of suspension components. Each of FIGS. 3-8 illustrates an assembly (186, 188, 190, 192, 194, or 196) that comprises a suspension component with a surface 200 extending over the flexible region 184 of the suspension component. The damping layer 182 is disposed in a pattern that extends onto the surface 200. The sealing layer 180 covers at least a portion of the damping layer 182 that would otherwise be exposed. The sealing layer 180 is formed of a material that is non-friable. "Non-friable" material is material that, when flexed, has a reduced emission of contaminating loose particles in comparison to the material used for the damping layer 182. The use of the non-friable sealing layer 180 contains or traps friable particles from a friable damping layer 182 and reduces contamination of the space surrounding the suspension component.

A first side of the damping layer 182 is preferably bonded to the surface 200 of the flexible region 184 which serves as a first shear restraint layer for the damping layer 182. The sealing layer 180 is preferably bonded to a second side of the damping layer 182. The bonded sealing layer 180 serve as a second shear restraint layer for a second side of the damping layer 182. When movement of the damping layer 182 is constrained by first and second shear layers, strain in the damping layer 182 increases and damping is greatly enhanced.

Figure 3:
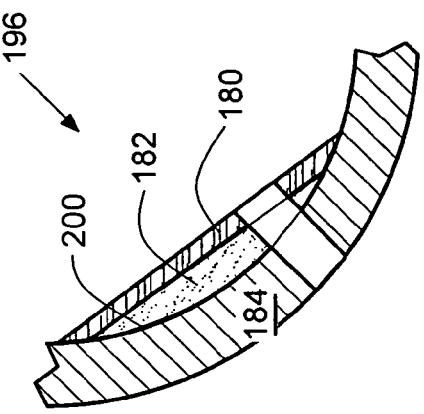
FIGS. 3-8 illustrate examples of sealing layers and damping layers disposed on flexible regions of suspension components.

FIG. 3 illustrates an assembly 186 which includes an abrupt discrete boundary 210 between the damping layer 182 and the sealing layer 180. The arrangement in FIG. 3 has the advantage of having damping characteristics that are readily predictable by computer modeling.

Figure 4:
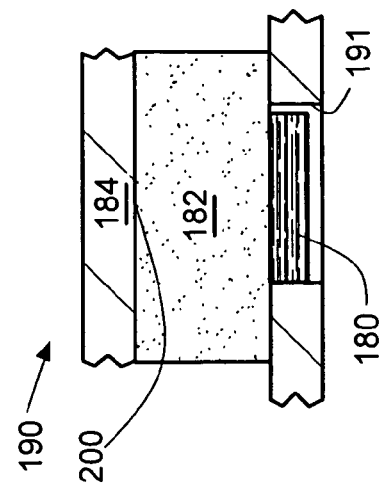

FIG. 4 illustrates an assembly 188 in which the damping layer 182 blends gradually into the sealing layer 180 so that there is no discrete boundary between the layers 180, 182. The arrangement in FIG. 4 has the advantage of being formed by simply curing an exposed surface of a deposit of damping material to form an integral, unitary sealing layer. There is no discrete boundary to form a stress concentration between cured and uncured material.

Figure 5:
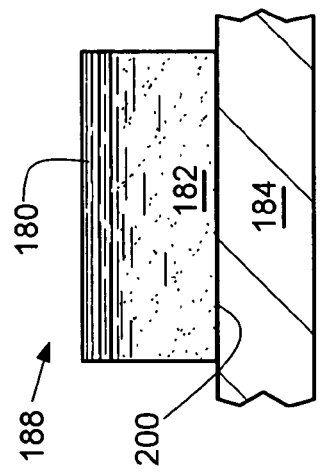

FIG. 5 illustrates an arrangement where an assembly 190 is a laminated structure that includes a hole 191 that defines a flexible region, and the sealing layer 180 is disposed in hole 191. The arrangement in FIG. 3 has the advantage of being able to cover holes (such as holes 149, 150) with damping material without having large areas of damping material exposed at the holes to contaminate the surroundings with particles.

Figure 6:
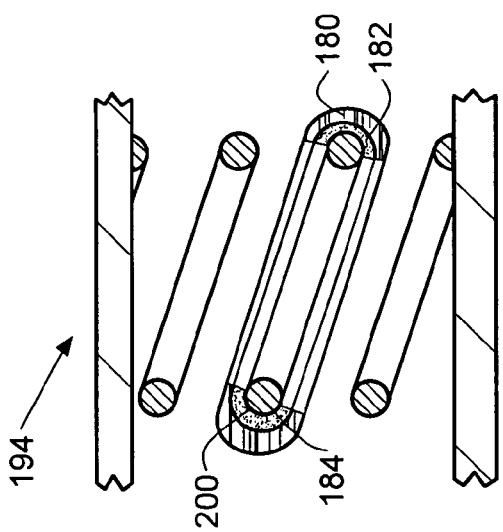

FIG. 6 illustrates an assembly 192 in which the sealing layer 180 is shaped to fully encapsulate the damping layer 182. The arrangement in FIG. 6 has the advantage of very robust containment of loose particles of the damping layer 182.

Figure 7:
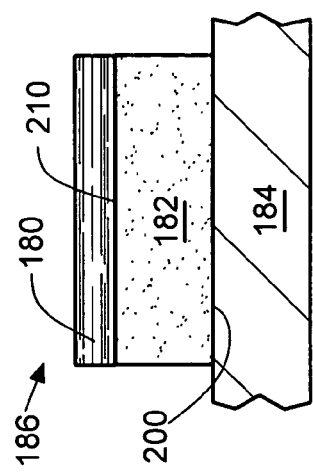

FIG. 7 illustrates an assembly 194 in which the flexible region 184 comprises a portion of a coil spring 195. The arrangement of FIG. 7 has the advantage of providing damping over very precisely defined regions of a complex surface of a flexible region of a suspension component.

Figure 8:
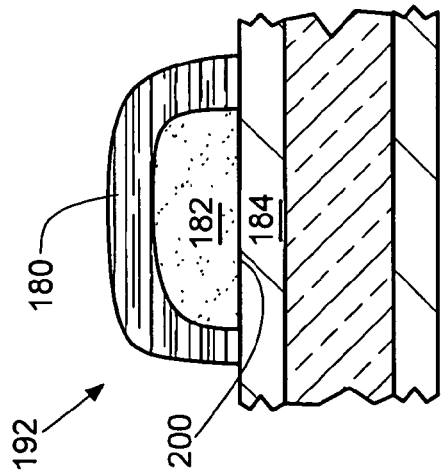

FIG. 8 illustrates an assembly 196 in which the flexible region 184 has a complex shape, and the damping layer 182 also has complex shaped adapted to the flexible region 184. FIG. 8 illustrates the advantage of forming the damping layer and sealing layer in shapes that are not completely flat and which avoid a hole in a surface.

Features illustrated in FIGS. 3-8 can be appropriately adapted and combined with one another to fill the needs of a particular application.

Figure 9:
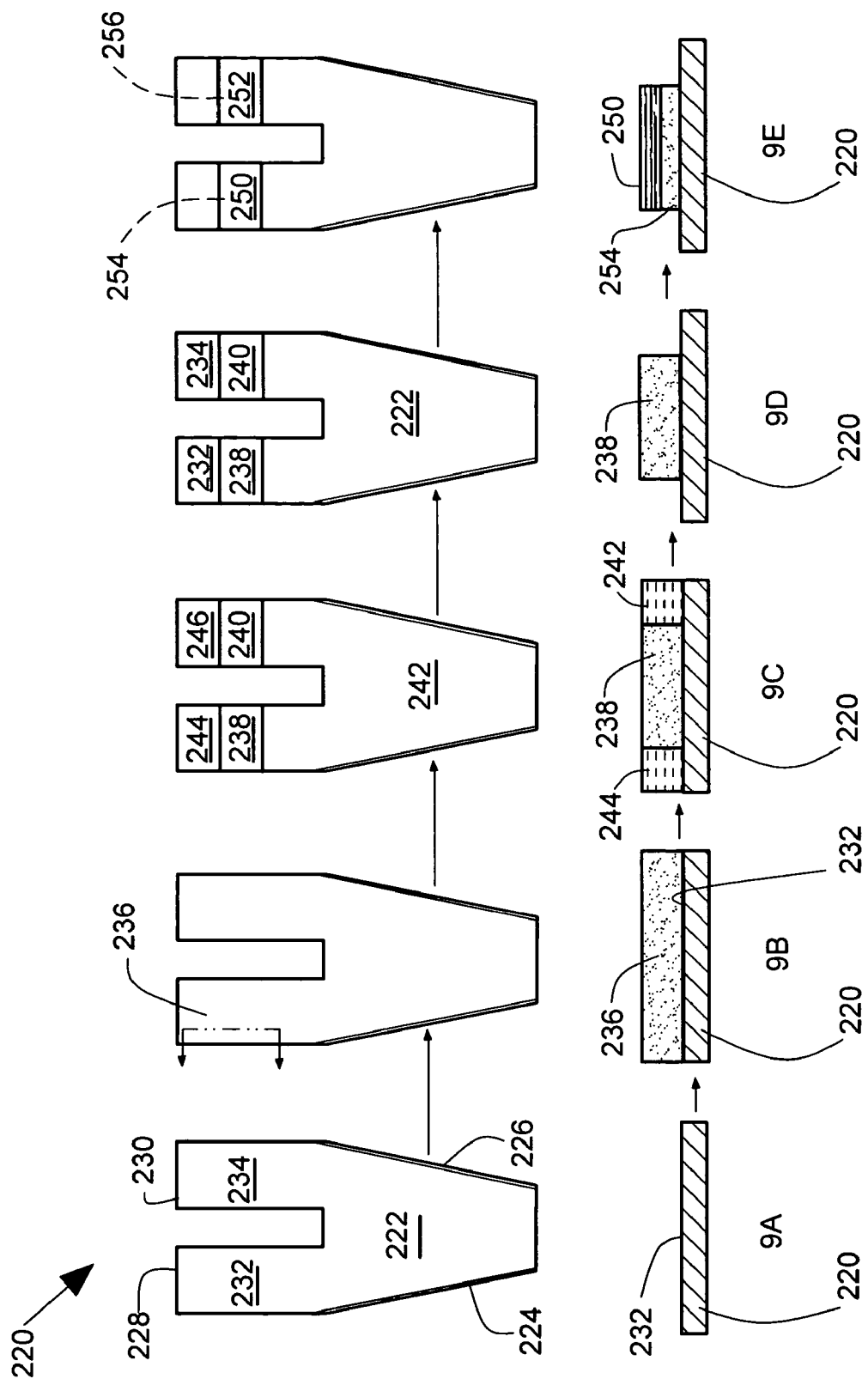
FIG. 9 illustrates a process of forming a sealing layer and a damping layer on a flexible region of a suspension component with photoresist.

FIG. 9 illustrates sequential process steps 9A-9E of depositing a sealing layer and a damping layer on a flexible region of a suspension component using photoresist material. The term "photoresist" refers to a material whose properties change on exposure to light (usually ultraviolet) and which has a different response to various etching methods (chemical, plasma, etc) depending on whether it has been exposed or not. Photoresists have stiffnesses and viscosities that can be controlled, varied or adjusted by processing.

Process step 9A schematically illustrates (in both plan and cross-sectional view) a first process step in which a suspension component 220 is formed of metal sheet and includes a wider region 222 with side rails 224, 226 which provide stiffening of the wider region 222. The suspension component also includes flexible regions 228, 230 that are not supported by stiffeners and which are narrower. The flexible regions 228, 230 have surfaces 232, 234.

Process step 9B schematically illustrates (in both plan and sectional view) a coat of photoresist 236 applied across a plan surface of the suspension component 220.

Process step 9C schematically illustrates (in both plan and sectional view) the photoresist after it has been selectively exposed (through a photolithographic mask) to light which selectively alters chemical properties of the exposed photoresist. After the selective exposure to light, regions 238, 240 are more resistant to being etched away, while regions 242, 244, 246 are less resistant to being etched away.

It will be understood by those skilled in the art that either negative or positive photoresist materials can be used with appropriate use of positive or negative masks. A photoresist such as SU8 from MicroChem Corporation of Newton, Mass. can be used.

Process step 9D schematically illustrates (in both plan and sectional view) the photoresist after the regions 242, 244, 246 that are less resistant have been etched away, leaving the desired photolithographically defined regions 238, 240 on the surfaces 232, 234. At least a portion of the thickness of regions 238, 240 is used a damping layer. Etching away of the regions 242, 244, 246 can be done using known etching techniques for the particular photoresist used.

Process step 9E schematically illustrates (in both plan and sectional view) the regions 238, 240 after top exposed surfaces of the regions 238, 240 are selectively heated or otherwise cured to form stiffened sealing layers 250, 252. The top portion of the damping layer is cured to form a sealing layer. A lower portion 254 of the damping layer remains resilient and serves as a damping layer. The process of selective heating to cure only a selected portion of the damping layer is described below in more detail in connection with FIG. 11.

The result of the processes 9A-9E illustrated in FIG. 9 are layers or bumps on the flexible material which has a hard outer surface and a softer, viscous core. The bump comprises a constrained layer damper which keeps particles of the viscous material effectively sealed away from the other surrounding components.

Figure 10:
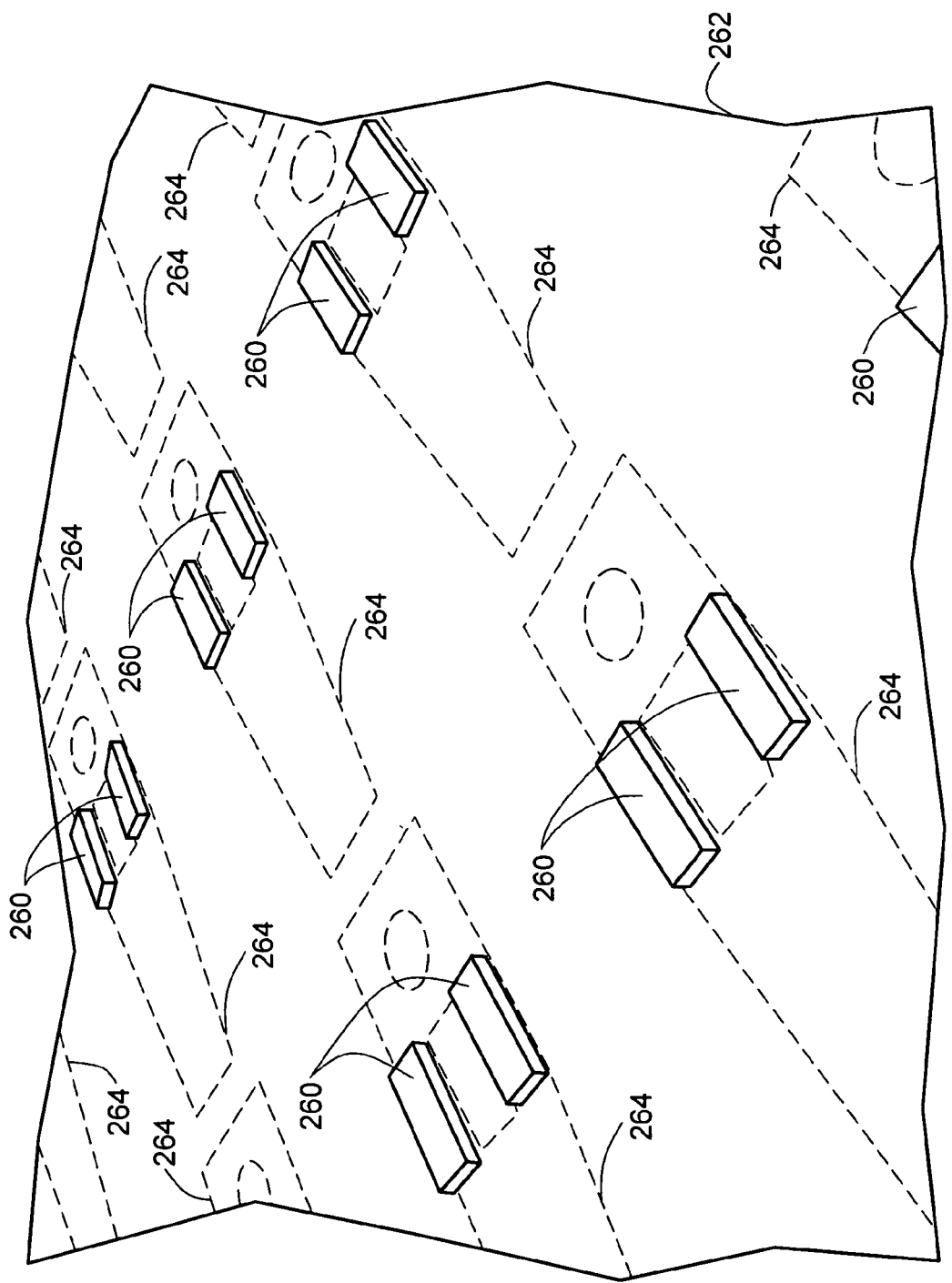
FIG. 10 illustrates multiple deposits patterned on a sheet of material that can be later separated into suspension components.

FIG. 10 schematically illustrates deposits of damping and sealing layers 260 on a surface of a metal sheet 262. The layers 260 are deposited in a regular step-and-repeat pattern 264 (illustrated in dashed lines) corresponding with a step-and-repeat pattern of multiple suspension components. The arrangement shown in FIG. 10 provides for a step-and-repeat batch fabrication of multiple suspension components with damping and sealing layers applied before the suspension components are removed from the sheet. The damping and sealing layers 260 can be deposited by any known deposition means such as use of photoresist (described above in connection with FIG. 9), or screen printing (described below in connection with FIG. 12). The individual suspension components are removed from the sheet 262 using known processes such as stamping or etching that are compatible with the presence of the layers 260. Non-batch processes can also be used to apply the damping and sealing layers after the suspension component is partially or even completely formed. Batch processing works best when the suspension is a flat, continuous surface. Temperatures and environments in the remaining manufacturing steps that damage or degrade the damping or sealing layer are to be avoided.

Figure 11:
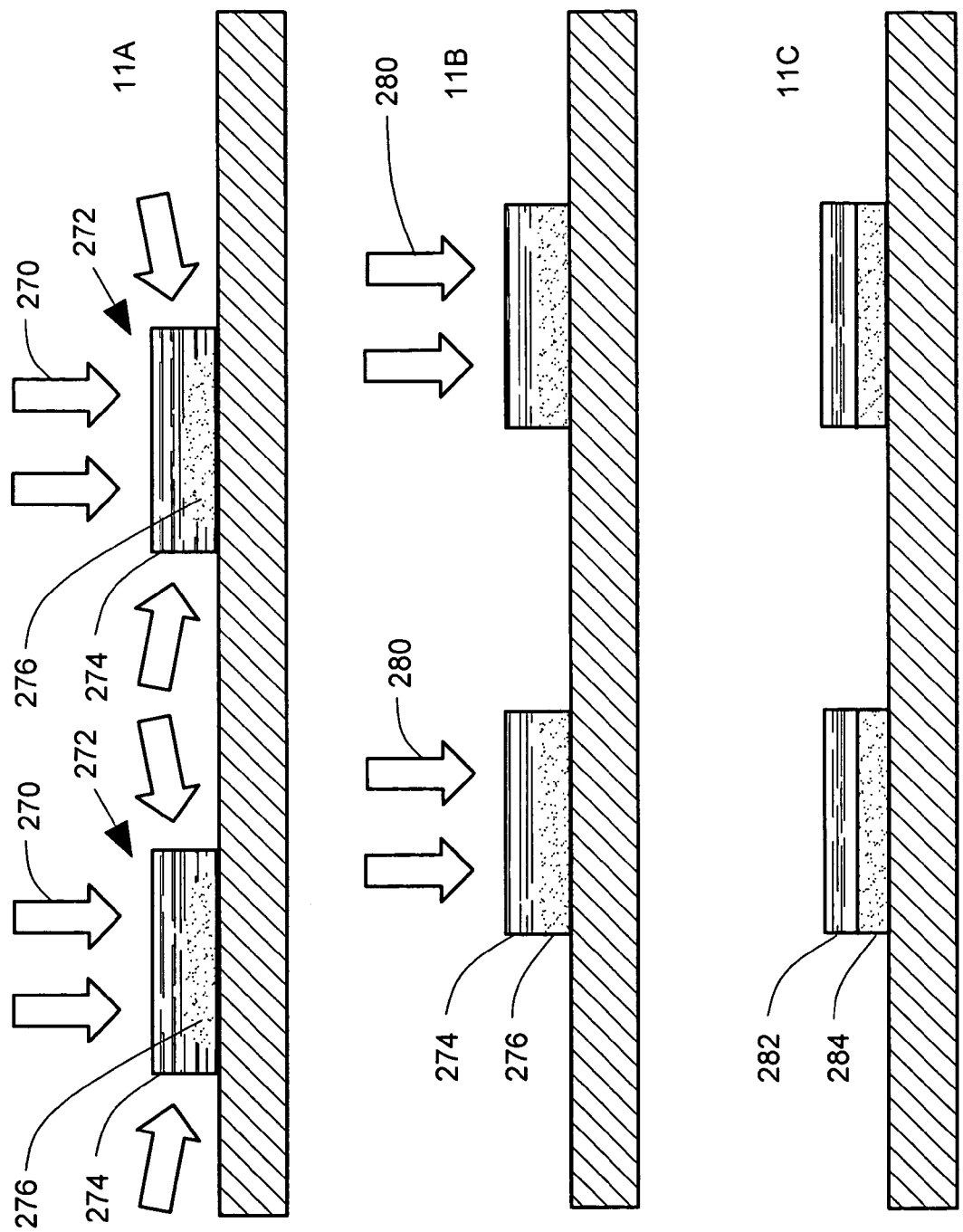
FIG. 11 illustrates processes of curing photoresist on a suspension component.

FIG. 11 illustrates processes of curing photoresist on a suspension component. When curing photoresist with a hot plate under a suspension component, heat will flow through the suspension component, then through the photoresist and flow out of the top outer surface of the photoresist. This hotplate process (not illustrated) does not give the desired variation in curing and therefore is not the best method.

As shown at process 11A, heat 270 flows from above photoresist deposits 272 for a controlled time from a controlled temperature thermal convection oven. Rapid thermal curing takes place at the top and lateral surfaces of photoresist deposits 272, and the photoresist is cured from the outer surface inwards. As a result, the curing times and temperatures can be selected such that the outer shell of resist is hard cured to form a sealing layer 274, while the inner core remains less cured to form a damping layer 276.

At process 11B, an alternative curing method uses an electron beam 280 for curing that results in a more precise control of curing depth. E-beam curing uses a electron beam gun that controls the depth of curing by applied voltage. With properly selected voltage, just the surface resist can be cured while the underlying deeper layers remain soft and viscous.

At process 11C, two types of photoresist that cure at a different temperatures are used. A low-curing temperature photoresist 282 is patterned over a high-curing temperature photoresist 284. By thermally curing the resist stack at a temperature high enough to cure the outer photoresist 282, but not high enough to cure the lower photoresist 284, the desired damping as well as sealing and shear restraint characteristics can be obtained. Other know methods that selectively harden an outer layer while keeping the inner layer soft can also be used.

Figure 12:
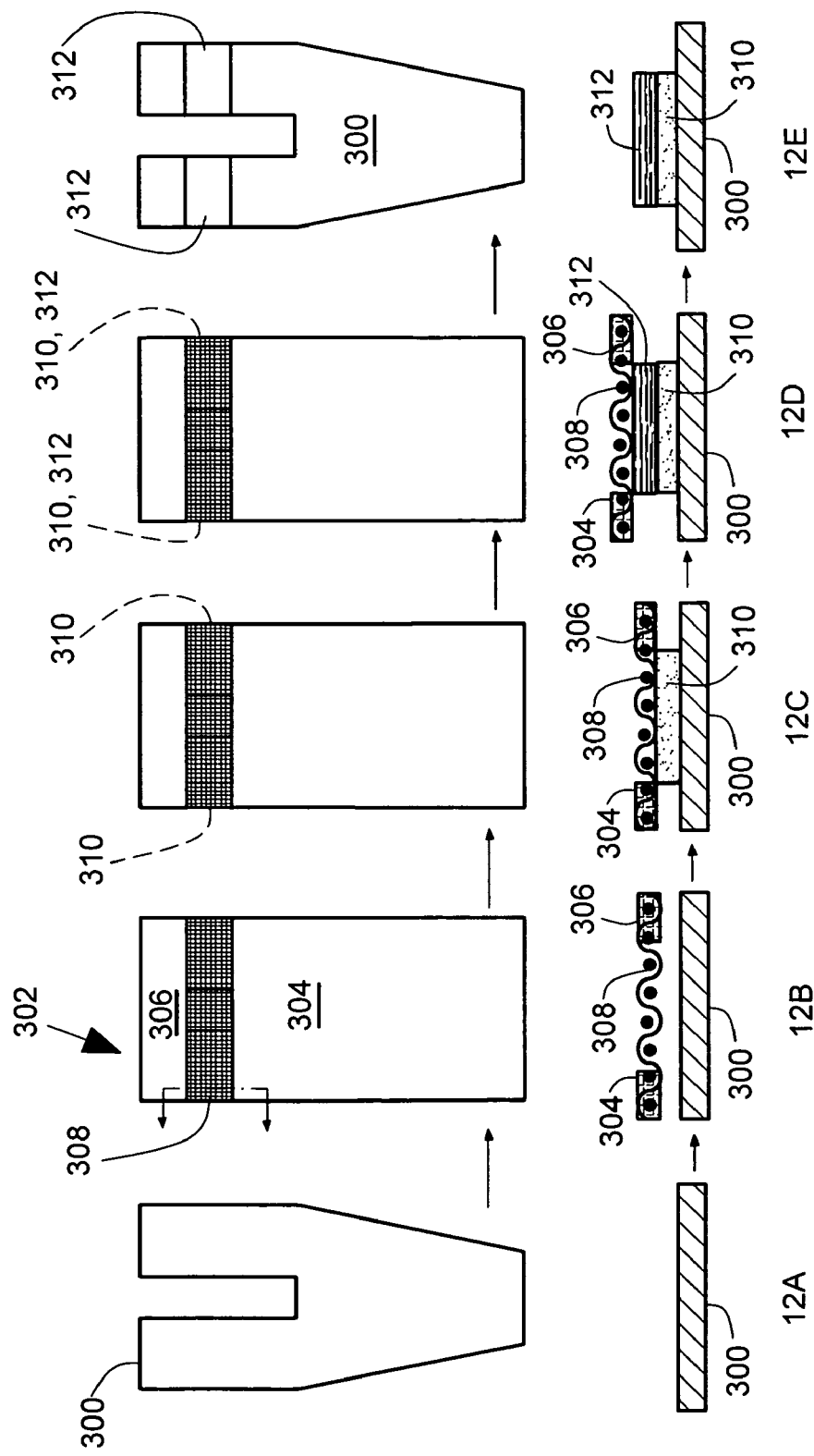
FIG. 12 illustrates a process of forming a damping layer and a sealing layer on a suspension component with screen printing.

FIG. 12 schematically illustrates processes of screen printing (e.g., silk screening, metal screening, synthetic fiber screening) a damping layer and a sealing layer on a suspension component.

At process 12A, a suspension component 300 is illustrated. Typically, suspension component 300 is part of a larger sheet of metal and is not separated from the sheet of metal at process 12A.

At process 12B, a photolithographically patterned printing screen 302 is temporarily placed over the suspension component 300. The printing screen 302 includes portions 304, 306 where the screen 302 is filled or blocked by screen printing emulsion, and portion 308 where the screen printing emulsion is not present and the screen 302 is therefore porous.

At process 12C, a first layer of viscous polymer 310 is screened onto the suspension component 300 in liquid form, and allowed to set into a solid. At process 12D, a second layer of viscous polymer 312 in liquid form is screened onto the first layer of viscous polymer 310, and allowed to set into a solid.

At process 12E, the printing screen 302 is removed and the suspension component has a damping layer 310 deposited on it and also a sealing layer 312 deposited on the damping layer 310.

A stiff overcoat such as diamond-like carbon (DLC) can be used in place of the second layer of viscous polymer 312 in order to provide a sealing and shear restraint layer. A viscous polymer that is thermally and vacuum compatible is preferred when DLC is applied by sputtering.

Patterning could be done before or after part etching, though if it is done before etching, the polymers are chosen to survive and not interfere with the etching process.

Figure 13:
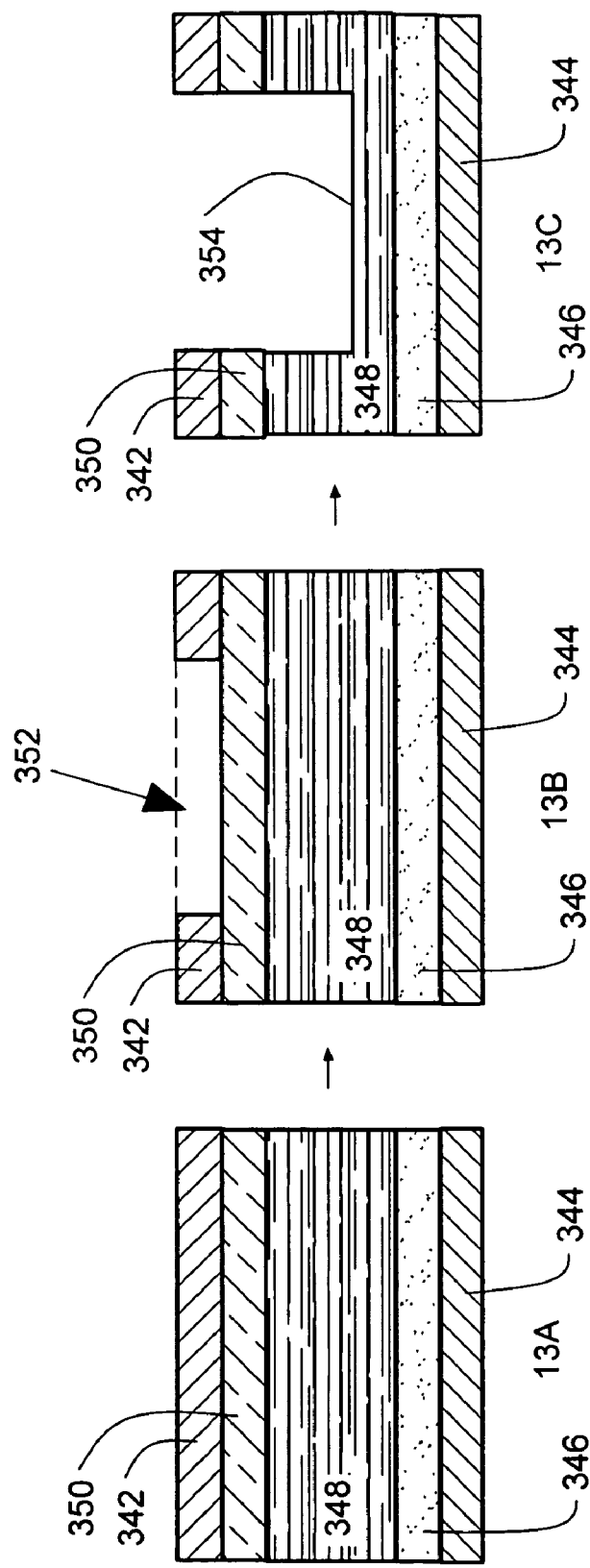
FIG. 13 illustrates processes of etching a laminated suspension component to form a flexible region.

FIG. 13 illustrates processes of etching a laminated suspension component. In process 13A, a laminated suspension component 340 includes top and bottom metal layers 342, 344, a layer of polyimide damping material 346, a layer of sealing material 348 and an adhesive layer 350. The laminated structure at process 13A is quite stiff and inflexible. When a portion of the metal layer 342 is etched away at 352, however, as shown at process 13B, a flexible region is formed. The etching continues at process 13C, leaving a layer of sealing material 354 that seals the damping layer 346 and also preferably acts as a constraining layer.

In a laminated load beam HGA, the load beam can be made of two steel sheets sandwiching a polyimide (or other material) core. This structure makes the main part of the load beam stiff, and in the hinge area (which needs to be more compliant) one steel layer and the core layer are etched away. A damping adhesive (damping layer 346) is used to laminate one of the steel sheets to the core, a constrained and an encapsulated damper layer can be made in the hinge area merely by etching.

Stiffness will vary more with partial etching than with full etching because the remaining core layer thickness will vary slightly from part to part. However, the benefits of damping in the hinge area can offset the stiffness variation.

Figure 14:
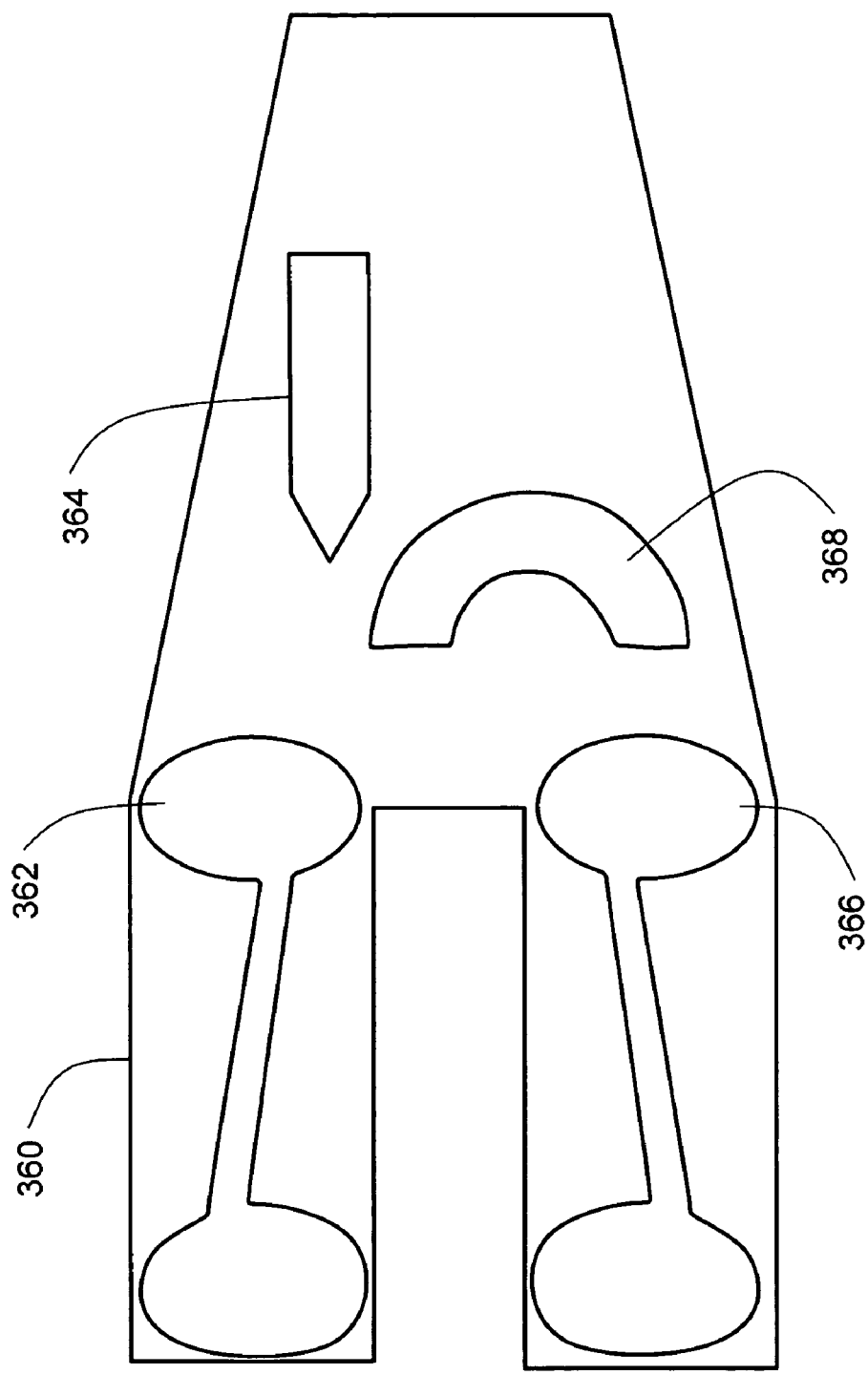
FIG. 14 illustrates a complex pattern of damping layers and sealing layers on a suspension component.

FIG. 14 illustrates a suspension component 360 with complex pattern 362, 364, 366, 368 of damping layer and sealing layers. As illustrated in FIG. 14, patterns can be highly complex, limited only by the resolution of the photolithography technique used, to provide damping that is adaptable to a wide variety of applications. Spaces on the suspension component 360 can be left uncovered by damping material for convenient assembly with FOS (flex on suspension) routing, tooling holes, gimbals and gimbal attach locations, preload bend and other formed regions. The ability to use complex shapes also enables maximum damping with minimum added mass.

Figure 15:
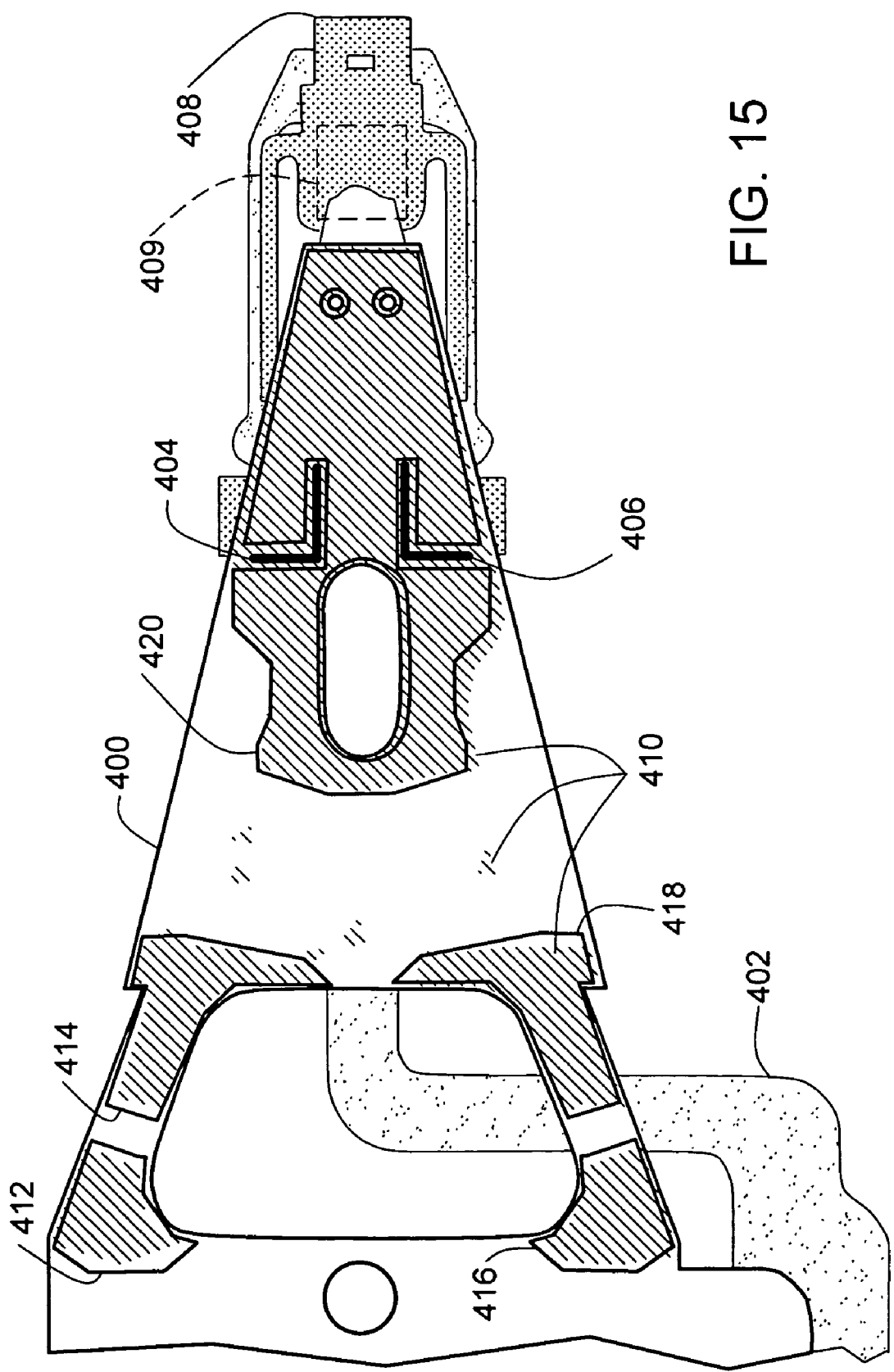
FIG. 15 illustrates areas of strain on a suspension component, and damping layers and sealing layer shaped to fit in the areas of strain.

FIG. 15 illustrates areas of strain on a suspension component and areas covered by a damping layer and a sealing layer. A load beam 400 is assembled with a flex on suspension (FOS) printed circuit 402, microactuators 404, 406, a gimbal strut 408 and a read/write head 409. Regions of the load beam 400 that are subject to high levels of strain are marked by diagonal lines 410. The regions 410 are identified by a computer simulation, or alternatively by measurement of strain with the assembly mounted in a operating disc drive. The larger regions of high strain are then covered with complex patterns of damping and sealing layers 412, 414, 416, 418, 420, which reduce the strain and reduce off track errors in positioning the read/write head.

Figure 16:
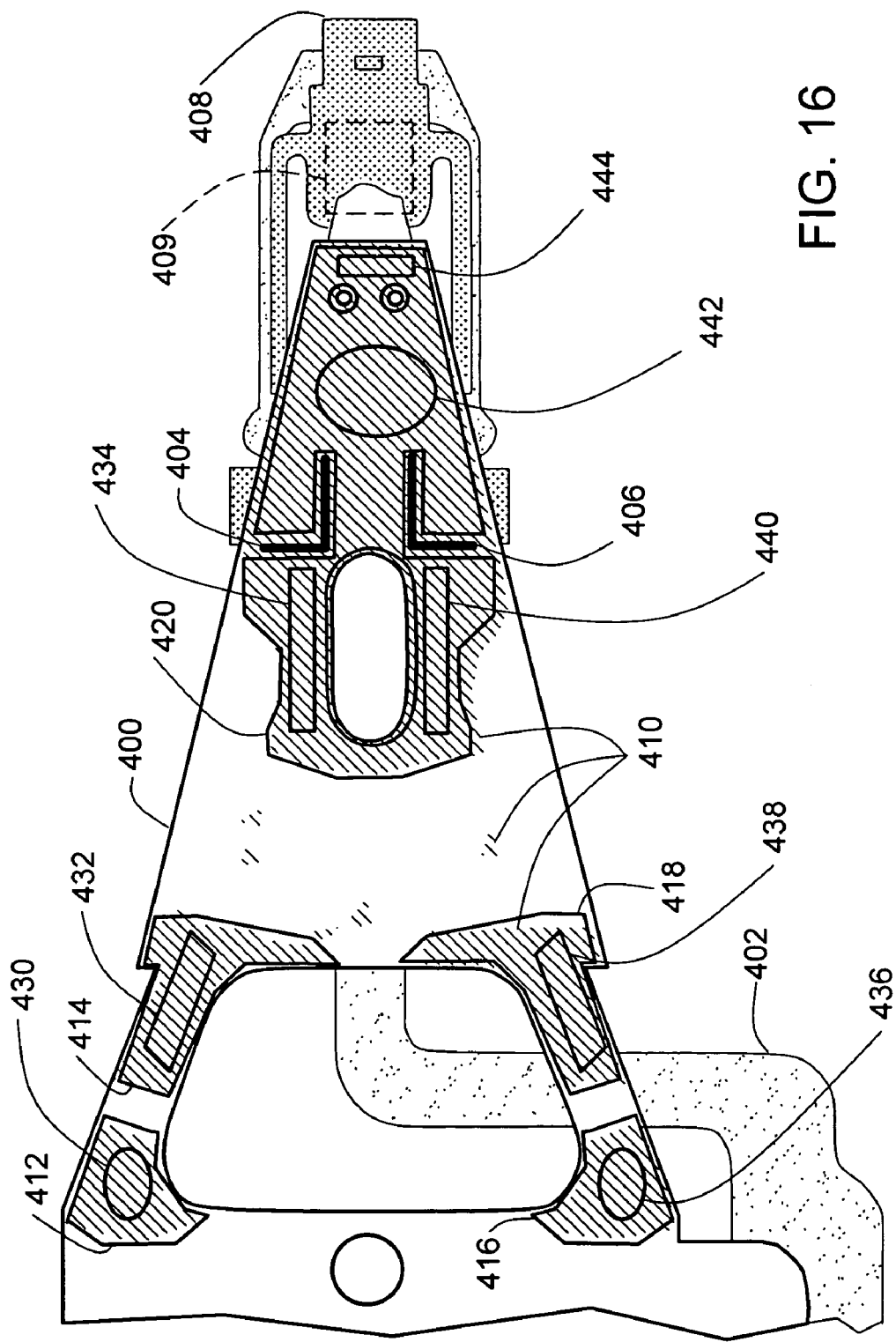
FIG. 16 illustrates areas of strain on a suspension component, and stacked multiple damping and sealing layers shaped to fit in the areas of high strain.

FIG. 16 illustrates an arrangement that is similar to the arrangement illustrated in FIG. 15. In FIG. 16, reference numbers that are the same as reference number used in FIG. 15 identify the same or similar features. In FIG. 16, additional sealing and damping layers 430, 432, 434, 436, 438, 440, 442, 444 are applied on top of existing damping and sealing layers. There are thus multiple layers of damping and sealing layers stacked on top of one another on the load beam 400. Materials with high damping properties also tend to have stiffness and damping properties that vary with temperature and (to a lesser extent) vibration frequency. Specifically, damping tends to peak at a particular temperature and fall off from there (gradually with warmer temperature, sharply with colder temperature). A disc drive environment has a wide operating range of temperatures (for example, from 5C to 65C). Different materials that have different peak temperatures, can be stacked to provide more uniform temperature characteristics. Also, the shape of a first stacked layer can differ from the shape of a second stacked layer upon which the first stacked layer is stacked in order to provide spatially varying damping characteristics. Damping material can also be made of a blend of two or more materials to obtain desired temperature characteristics. This will reduce the peak level of damping but spread out the temperature range.

Figure 17:
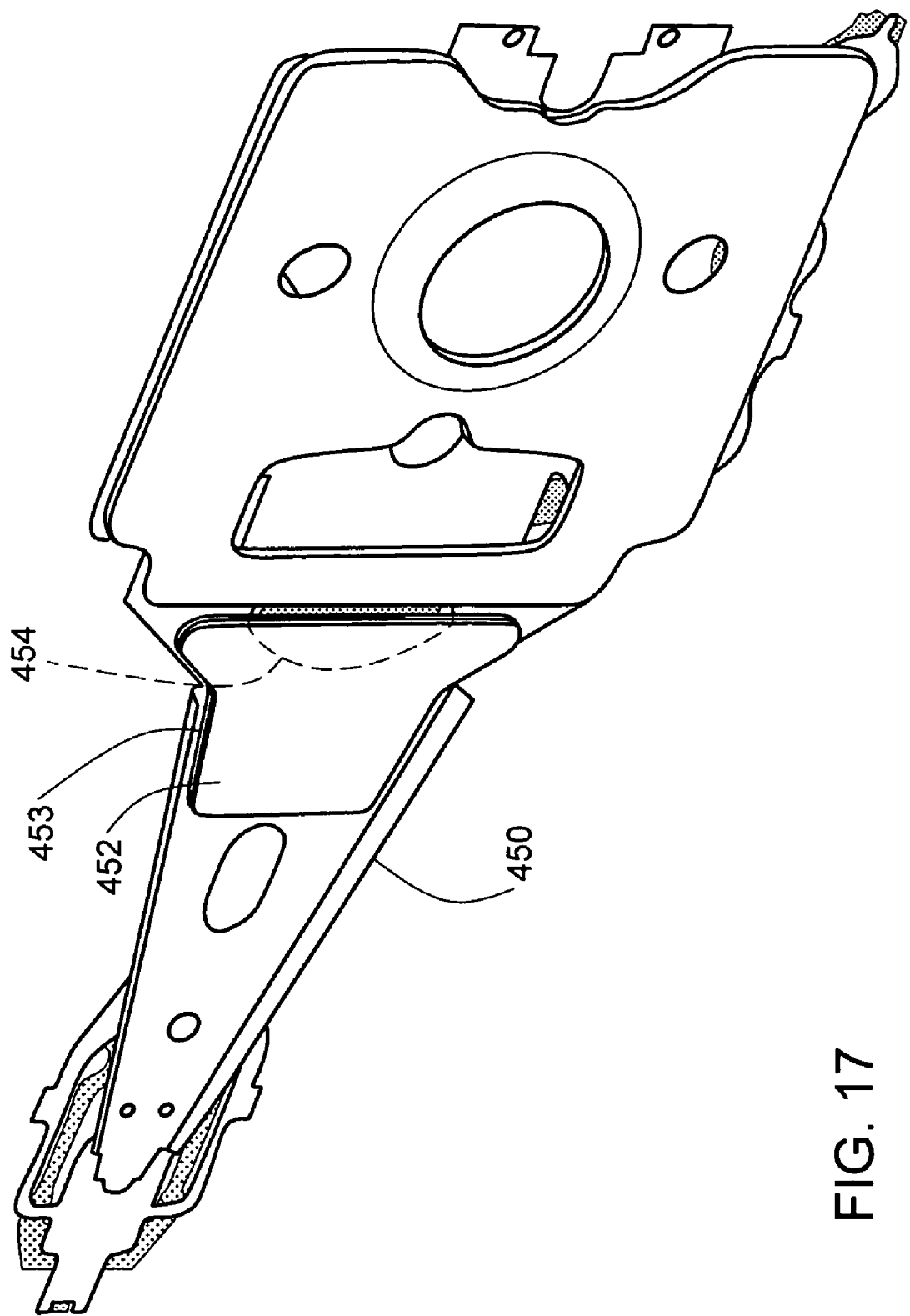
FIG. 17 illustrates an oblique view of a top side of a suspension component.
Figure 18:
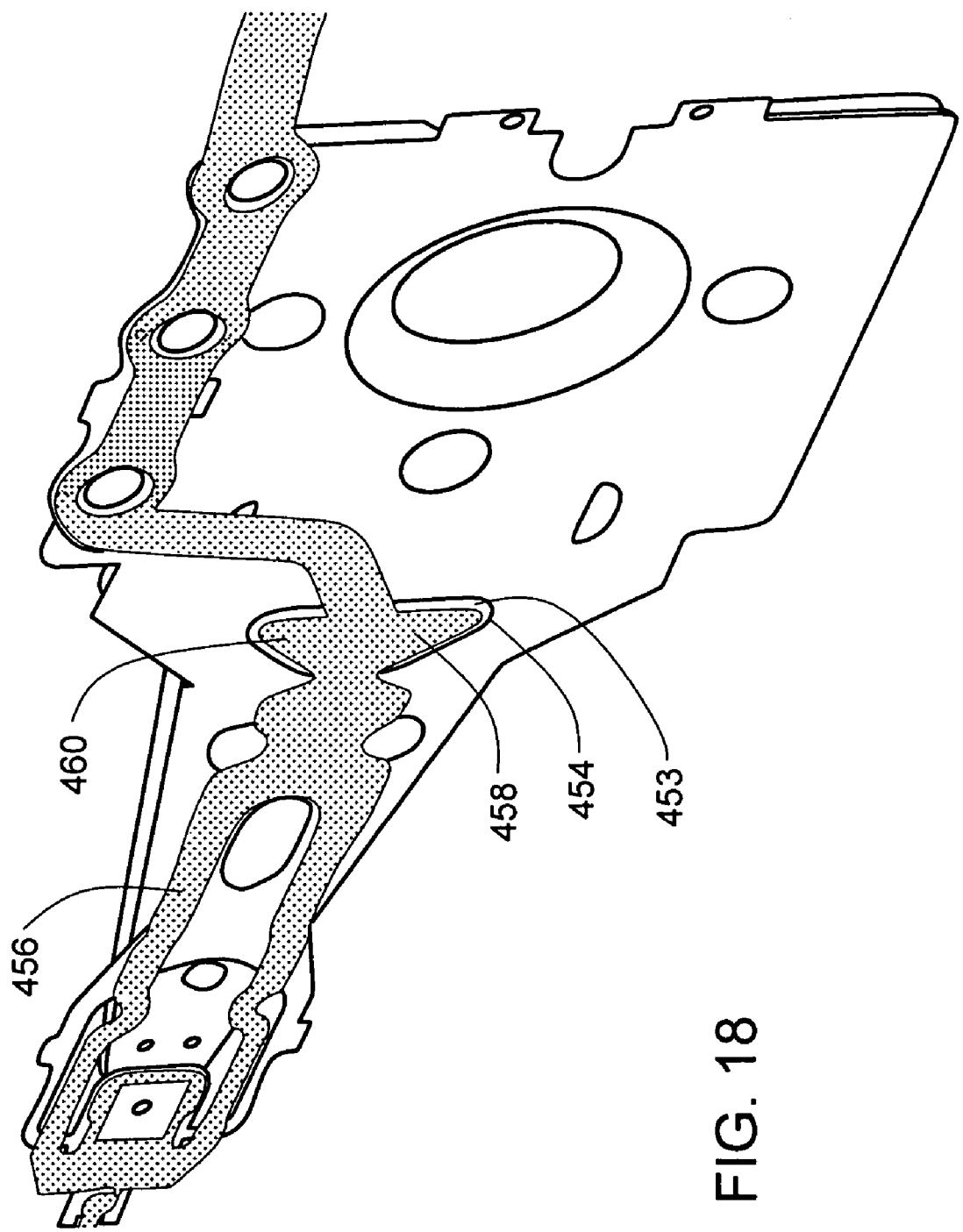
FIG. 18 illustrates an oblique view of a bottom side of the suspension component illustrated in FIG. 17.

FIG. 17 illustrates an oblique view of a top side of an disc drive suspension component 450 and FIG. 18 illustrates an oblique view of a bottom side of the suspension component 450. A damping layer 453 and a sealing layer 452 are disposed on the top side of the suspension component 450, however, the damping and sealing layers 452, 453 extend over a large hole 454. The ability of the damping and sealing layer 452 to control strain in the suspension component 450 is subject to degradation because the hole interrupts the shear restraint function of the suspension component 450. A large portion of the friable damping layer 453 is exposed through the hole and is subject to contaminating the surroundings with loose particles. These problems are overcome, however, by shaping a flex-on-suspension printed circuit 456 (FIG. 18) to include (electrically non-functional) extensions or flaps 458, 460 of the polyimide layer of the printed circuit 456. The polyimide extensions or flaps 458, 460 substantially cover the hole 454 and function as sealing layers and shear restrain layers extending across the hole 454.

The arrangement of FIGS. 17-18 avoids having large areas of exposed adhesive when using a full size preload bend damper. The damping and sealing layers 452, 453, when adhered to the flaps 458, 460 is very effective in attenuating suspension resonance modes. The arrangement is particularly effective because the hole directly faces the rotating disk and thus has the potential of contaminating the disk thus resulting in the head crashing into the rotating disk. Addition of the flaps 458, 460 adds no cost to the printed circuit 456. No additional components are needed and no significant changes to the assembly processes are required. Given that the flaps 458, 460 are thin and small, added mass and stiffness to the suspension is negligible and thus there is no significant impact on suspension performance.

Having a damper on an HGA is an effective way of attenuating resonance modes. Damper in the preload bend section near the hole 454 is especially effective in significantly attenuating gain of resonance modes.

Figure 19:
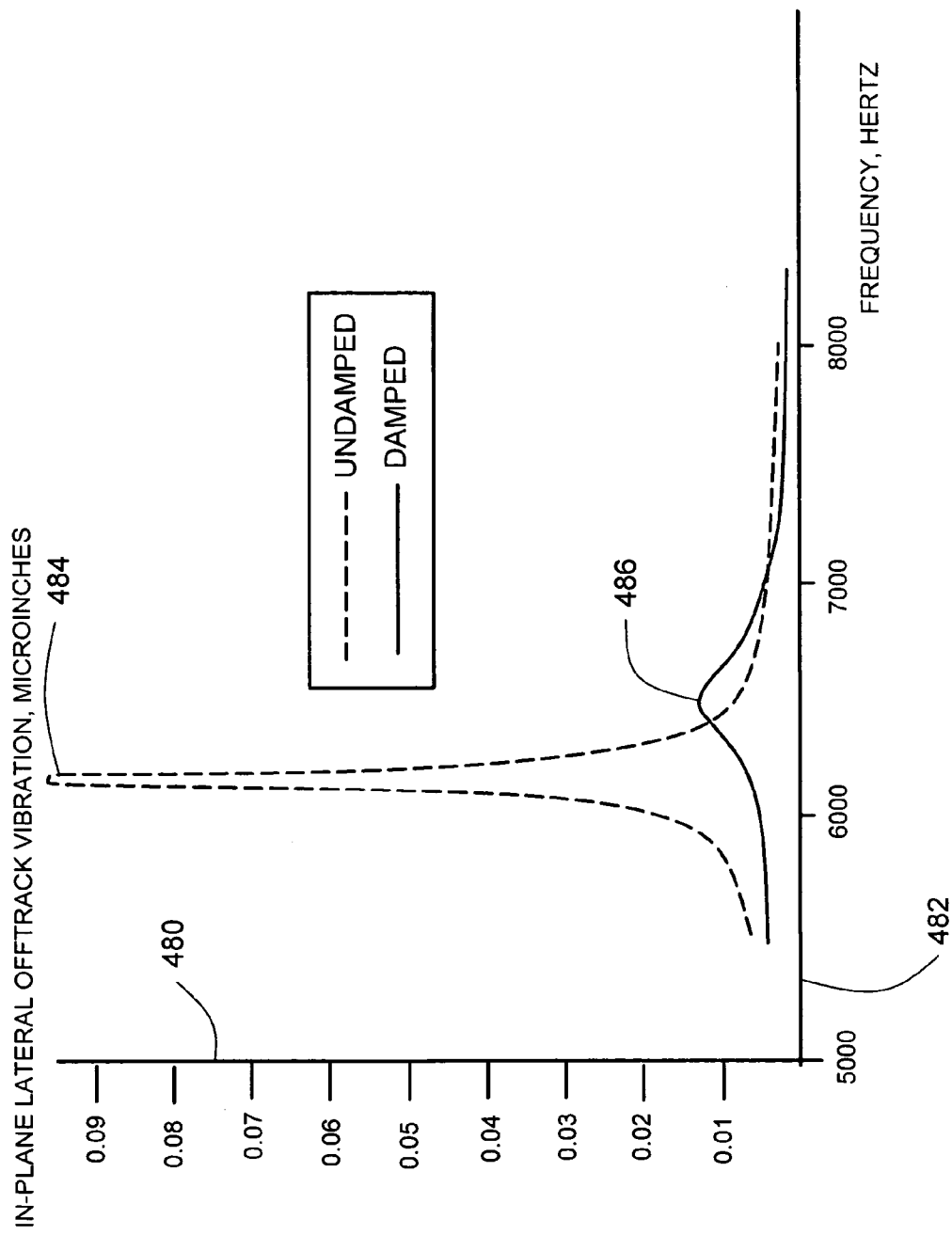
FIGS. 19-20 illustrate graphs of spectral distributions of in-plane and out-of-plane vibration in a read/write head, with and without use of a damper layer and sealing layer on a suspension for the read/write head.
Figure 20:
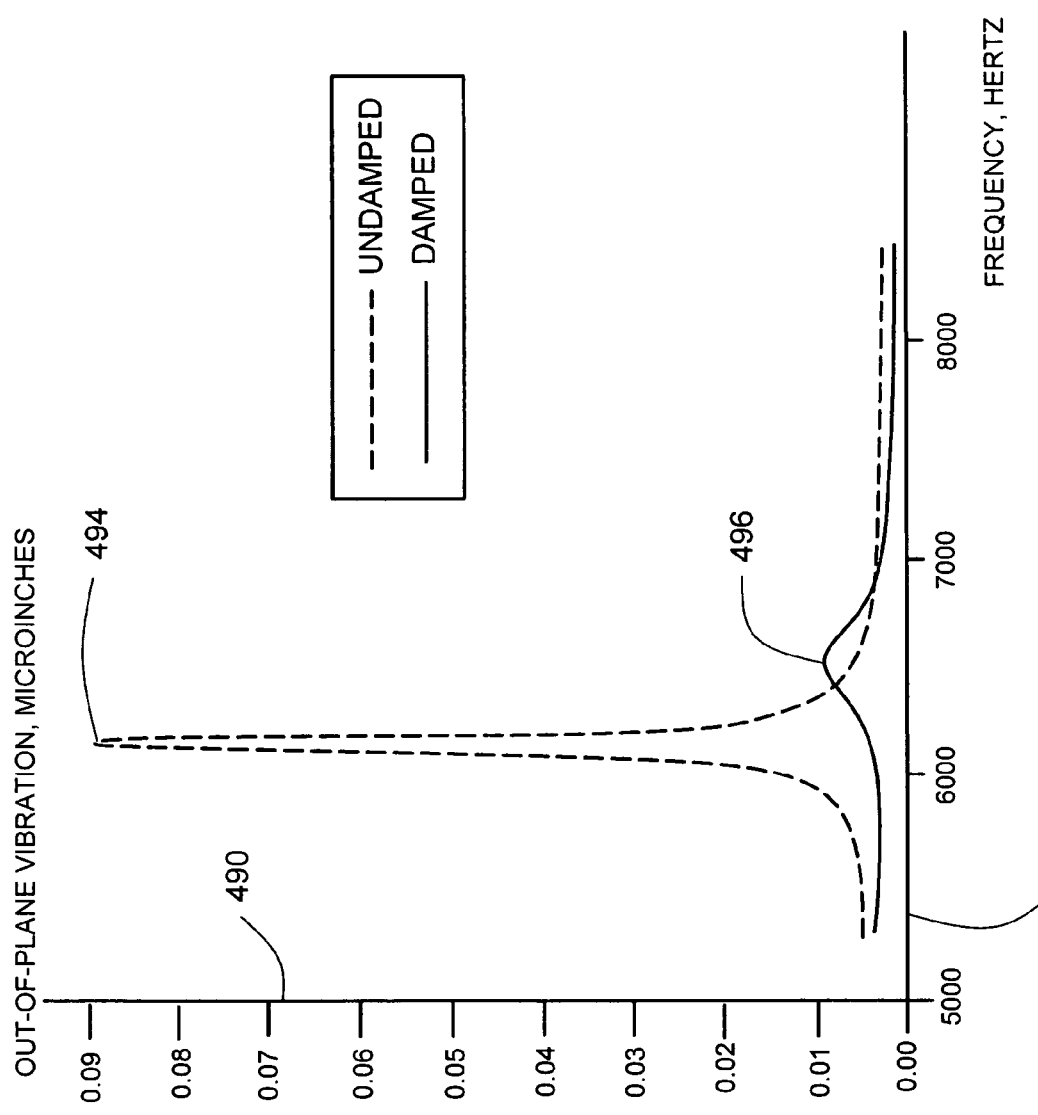

FIGS. 19-20 illustrate a graph of spectral distribution of vibration in a suspension component with and without use of a damper layer and sealing layer such as that illustrated in FIGS. 17-18.

In FIG. 19, a vertical axis 480 represents in-plane lateral off track vibration of a read/write head in microinches, and a horizontal axis 482 represents frequency in hertz. A dashed line 484 represents results without the use of damper and a solid line 486 represents results with the use of a damping and sealing layer as described above in connection with FIGS. 17-18. As shown in FIG. 19, the in-plane lateral off track motion due to strain is reduced by a factor of about 10.

In FIG. 20, a vertical axis 490 represents out-of-plane vibration of a read/write head in microinches, and a horizontal axis 492 represents frequency in hertz. A dashed line 494 represents results without the use of damper and a solid line 496 represents results with the use of a damping and sealing layer as described above in connection with FIGS. 17-18. As shown in FIG. 20, the out-of-plane lateral off track motion due to strain is reduced by a factor of about 10.

In summary, an assembly (such as 186) includes a suspension component with a surface (such as 200) that extends over a flexible region (such as 184) of the suspension component. The assembly also includes a damping layer (such as 182) disposed in a pattern that extends onto the surface. A sealing layer (such as 180) that is non-friable covers the damping layer. The sealing layer preferably also serves as a shear restraint layer for the damping layer.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the assembly while maintaining substantially the same functionality without departing from the scope of the present invention. In addition, although the preferred embodiment described herein is directed to a suspension system for a disc drive, it will be appreciated by those skilled in the art that the teachings of the present invention can be applied to other systems that can be contaminated by friable damping materials, without departing from the scope of the present invention.

What is claimed is:

1. An assembly, comprising:
    a suspension component with a surface extending over a flexible region of the suspension component;
    a damping layer disposed in a pattern that extends onto the surface; and
    a sealing layer that is non-friable and that covers the damping layer and wherein the damping layer blends gradually into the sealing layer.

2. The assembly of claim 1 wherein the sealing layer comprises a shear restraint layer for the damping layer.

3. The assembly of claim 1 wherein the sealing layer comprises a cured damping layer.

4. The assembly of claim 1 wherein the damping layer is friable and the sealing layer traps particles of the damping layer.

5. The assembly of claim 1 further comprising a sealed housing surrounding the suspension component, the damping layer and the sealing layer.

6. The assembly of claim 5 wherein the sealed housing is a housing of a disc drive and the sealing layer prevents the particles from contaminating the disc drive.

7. The assembly of claim 5 wherein the suspension component is a strut and the flexible region is a preloaded spring providing preload force for a read/write head in the sealed housing.

8. An assembly, comprising:
    a suspension component with a surface extending over a flexible region of the suspension component;
    a damping layer disposed in a pattern that extends onto the surface; and
    a sealing layer that is non-friable and that covers the damping layer and wherein the damping layer comprises a positive or negative photoresist material.

9. The assembly of claim 8 wherein the sealing layer comprises an extension of a flexible printed circuit.

10. The assembly of claim 8 wherein the suspension component comprises a hole, and a portion of the damping layer extends over the hole and the sealing layer covers the portion of the damping layer that extends over the hole.

11. The assembly of claim 8 wherein the sealing layer comprises a shear restraint layer for the damping layer.

12. The assembly of claim 8 wherein the sealing layer comprises a cured damping layer.

13. The assembly of claim 8 wherein the damping layer is friable and the sealing layer traps particles of the damping layer.

14. The assembly of claim 8 further comprising a sealed housing surrounding the suspension component, the damping layer and the sealing layer.

15. The assembly of claim 14 wherein the sealed housing is a housing of a disc drive and the sealing layer prevents the particles from contaminating the disc drive.

16. The assembly of claim 14 wherein the suspension component is a strut and the flexible region is a preloaded spring providing preload force for a read/write head in the sealed housing.

17. An assembly, comprising:
    a suspension component with a surface extending over a flexible region of the suspension component;
    a damping layer disposed in a pattern that extends onto the surface; and
    means for sealing that covers the damping layer and that is non-friable.

18. The assembly of claim 17 wherein the damping layer is friable and the means for sealing traps particles of the damping layer.

19. The assembly of claim 18 further comprising a sealed housing surrounding the suspension component, the damping layer and the means for sealing.

20. The assembly of claim 19 wherein the sealed housing is a housing of a disc drive and the sealing layer prevents the particles from contaminating the disc drive.

* * * * *